United States Patent
Jeon et al.

(10) Patent No.: US 8,344,995 B2
(45) Date of Patent: Jan. 1, 2013

(54) PORTABLE ELECTRONIC DEVICE AND ILLUMINATION CONTROLLING METHOD THEREOF

(75) Inventors: Byeong-Hui Jeon, Gyeonggi-do (KR); Hong-Ju Kim, Gyeonggi-do (KR); Sang-Wook Lee, Chungcheongnam-Do (KR)

(73) Assignee: LG Electronics Inc., Seoul (KR)

( * ) Notice: Subject to any disclaimer, the term of this patent is extended or adjusted under 35 U.S.C. 154(b) by 411 days.

(21) Appl. No.: 12/649,198

(22) Filed: Dec. 29, 2009

(65) Prior Publication Data

US 2011/0037576 A1 Feb. 17, 2011

(30) Foreign Application Priority Data

Aug. 14, 2009 (KR) .................. 10-2009-0075300

(51) Int. Cl.
*G09G 3/36* (2006.01)
(52) U.S. Cl. ........ 345/102; 345/104; 345/156; 345/173; 345/659; 345/690; 715/784; 715/785; 715/786; 715/787; 178/18.01; 362/97.1
(58) Field of Classification Search .............. 345/87–90, 345/102, 156–159, 173–176, 659, 690, 104; 713/300–324; 715/690, 784–787; 178/18.01–20.04; 362/97.1–97.3; 349/65, 69–70
See application file for complete search history.

(56) References Cited

U.S. PATENT DOCUMENTS

| | | | |
|---|---|---|---|
| 5,361,081 A | 11/1994 | Barnaby | |
| 5,477,236 A | 12/1995 | Nanbu | |
| 5,796,382 A * | 8/1998 | Beeteson | 345/102 |
| 5,822,599 A * | 10/1998 | Kidder et al. | 713/324 |
| 6,300,967 B1 * | 10/2001 | Wagner et al. | 715/784 |
| 6,476,831 B1 * | 11/2002 | Wirth et al. | 715/784 |
| 6,750,886 B1 * | 6/2004 | Bergstedt | 715/784 |
| 6,753,842 B1 | 6/2004 | Williams et al. | |
| 6,803,930 B1 * | 10/2004 | Simonson | 715/784 |
| 6,847,386 B2 * | 1/2005 | Paleiov | 345/684 |
| 7,036,025 B2 * | 4/2006 | Hunter | 713/300 |
| 7,389,432 B2 * | 6/2008 | Chandley et al. | 713/320 |
| 7,614,011 B2 * | 11/2009 | Karidis et al. | 715/789 |
| 7,770,130 B1 * | 8/2010 | Kaptelinin | 715/787 |
| 7,880,718 B2 * | 2/2011 | Cradick et al. | 345/156 |
| 7,920,320 B2 * | 4/2011 | Watson et al. | 359/296 |
| 7,965,267 B2 * | 6/2011 | Baek | 345/87 |
| 8,217,947 B2 * | 7/2012 | Roth | 345/467 |

(Continued)

FOREIGN PATENT DOCUMENTS

EP 2040144 3/2009

*Primary Examiner* — Lun-Yi Lao
*Assistant Examiner* — Gregory J Tryder
(74) *Attorney, Agent, or Firm* — Lee, Hong, Degerman, Kang & Waimey

(57) ABSTRACT

A portable display device includes a display formed with electronic paper, an illuminating unit, and a controller. The electronic paper displays data in response to applied electrical current, and maintains displaying of the data in an absence of the applied electrical current. The illuminating unit selectively illuminates each particular region of a plurality of regions of the display and includes a plurality of light sources which are individually associated with one or more of the plurality of regions of the display. The controller activates the illuminating unit, selectively activating a first group of the plurality of light sources to illuminate a particular region of the display responsive to user contact, and the first group includes at least one of the plurality of light sources.

18 Claims, 7 Drawing Sheets

U.S. PATENT DOCUMENTS

| | | |
|---|---|---|
| 2002/0109664 A1 | 8/2002 | Shimada |
| 2003/0052903 A1* | 3/2003 | Weast ............................ 345/690 |
| 2003/0135288 A1 | 7/2003 | Ranganathan et al. |
| 2004/0120684 A1* | 6/2004 | Ishibashi et al. .............. 385/141 |
| 2005/0057539 A1* | 3/2005 | Ong .............................. 345/204 |
| 2007/0037610 A1* | 2/2007 | Logan ........................... 455/574 |
| 2007/0176898 A1 | 8/2007 | Suh |
| 2008/0111833 A1 | 5/2008 | Thorn et al. |
| 2009/0150822 A1* | 6/2009 | Miller et al. ................... 715/784 |
| 2009/0160541 A1 | 6/2009 | Liu et al. |
| 2009/0295740 A1* | 12/2009 | Lee ................................ 345/173 |
| 2009/0319942 A1* | 12/2009 | Delia et al. .................... 715/785 |

* cited by examiner

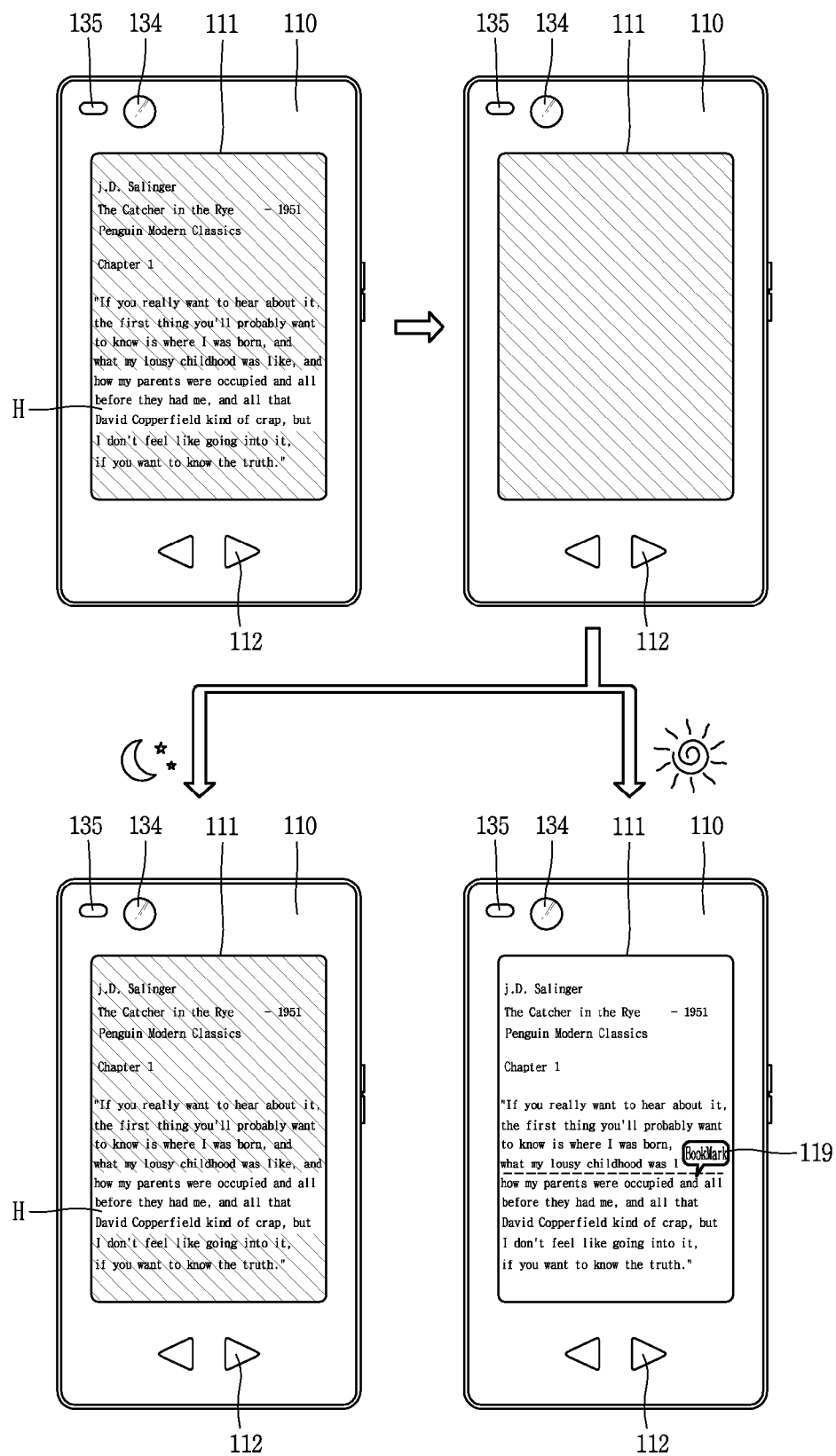

PORTABLE ELECTRONIC DEVICE AND ILLUMINATION CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2009-0075300, filed on Aug. 14, 2009, the content of which is incorporated by reference herein in its entirety.

FIELD OF THE INVENTION

The present application discloses a portable electronic device and an illumination controlling method of the same. In particular, the portable electronic device has an illuminating unit for illuminating a display.

DESCRIPTION OF THE RELATED ART

A portable electronic device can be carried around and used to perform at least one function including voice and video call communications, inputting and outputting information, storing data, and the like. The portable electronic device may be implemented as a laptop computer, a mobile phone, a smart phone, a digital broadcasting terminal, personal digital assistants (PDA), a portable multimedia player (PMP), a navigator, and the like.

A display applied to the portable electronic device is implemented as a liquid crystal display (LCD), a thin film transistor liquid crystal display (TFT LCD), an organic light emitting diode (OLED), or the like. Recently, E-paper has been implemented in the display. The E-paper has many advantages over the conventional display panels because it has a thinner thickness and requires less energy than the conventional display panel.

However, the E-paper does not emit its own light, but reflects ambient light. Thus, external illumination is necessary to be able to see text or images on the E-paper at night. Therefore, there is a need for a method for effectively implementing an illumination mechanism that is capable of illuminating the E-paper applied to the portable electronic device.

SUMMARY OF THE INVENTION

In accordance with an embodiment of the present invention, a portable display device includes a display formed with electronic paper, an illuminating unit, and a controller. The electronic paper displays data in response to applied electrical current, and maintains displaying of the data in an absence of the applied electrical current. The illuminating unit selectively illuminates each particular region of a plurality of regions of the display and includes a plurality of light sources which are individually associated with one or more of the plurality of regions of the display. The controller activates the illuminating unit, selectively activating a first group of the plurality of light sources to illuminate a particular region of the display responsive to user contact, and the first group includes at least one of the plurality of light sources.

In accordance with another embodiment of the present invention, a portable device includes a display comprising a plurality of display areas, a touch sensor positioned proximate to the display and configured to detect user contact relative to each of the plurality of display areas and an illuminating unit selectively illuminating each particular display area of the plurality of display areas. The illuminating unit includes a plurality of light sources which are individually associated with one or more of the plurality display areas. The portable device further includes a controller activating the illuminating unit, selectively activating one or more of the plurality of light sources to illuminate a particular display area of the display responsive to the user contact. The particular display area of the plurality of display areas that is illuminated corresponds to which display area of the plurality of display areas the user contact is detected via the touch sensor.

In accordance with yet another embodiment of the present invention, a portable device includes a display with a plurality of display areas, an illuminating unit selectively illuminating a particular area of the plurality of display areas, the illuminating unit including a plurality of light sources, and a controller activating the illuminating unit to selectively activate at least one of the plurality of light sources and illuminate the particular area responsive to a user input.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawings.

FIG. 11 illustrates operating a portable electronic device in accordance with an embodiment of the present invention.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. A portable electronic device according to an embodiment of the present invention may be implemented as an electronic book (E-book), a mobile phone, a smart phone, a laptop computer, a digital broadcasting terminal, a personal digital assistants (PDA), a portable multimedia player (PMP), a navigator, and the like. Although the E-book is used as an example of the portable electronic device in the following description of various embodiments of the present invention, the portable electronic device is not limited to the E-book.

Figure 1:
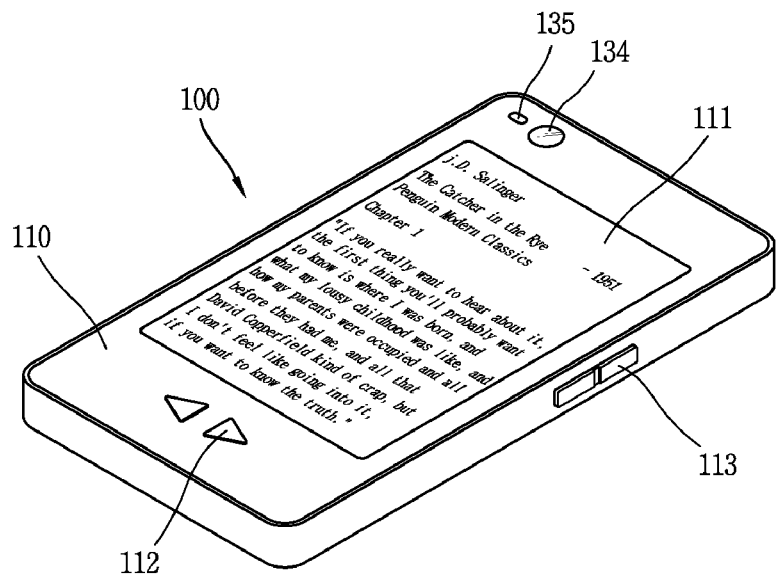
FIG. 1 is a front perspective view of a portable electronic device in accordance with an embodiment of the present invention.

FIG. 1 shows an electronic book (E-book) as an example of the portable electronic device 100 according to an embodiment of the present invention. While the E-book refers to an electronic form of printing that can be read by a reader, the E-book may refer to any type of reader configured to read printing. The E-book can carry information of a large amount of books in a single portable device, and thus, reduce a user's burden to carry heavy books. Accordingly, the E-book is welcomed as a popular means to replace paper printing now and in the future.

The portable electronic device 100 according to an embodiment of the present invention comprises a body 110, a display 111, user input units 112, 113, and the like. The body 110 includes a case (casing, housing, cover, or the like) that defines the appearance of the portable electronic device 100. Various electronic components are mounted in the case. The case may be formed by injection-molding synthetic resin, or formed by using metallic material such as stainless steel (STS) or titanium (Ti).

The display 111 visually outputs or displays information processed by the portable electronic device 100, such as texts, images, graphics, and contents. The display 111 may further include a touch screen to allow information input by a user's touch.

The display 111 may be implemented as a liquid crystal display (LCD), a thin film transistor-liquid crystal display (TFT LCD), an organic light emitting diode (OLED), a flexible display, or the like. However, for the purpose of description of the present disclosure, the display 111 is implemented as E-paper suitable for the E-book.

The E-paper typically has the following advantages. The E-paper provides a paper-like texture such that it appears like paper, thus reducing eye fatigue. Furthermore, the E-paper is thinner and requires less energy than the conventional display panel.

This E-paper may be implemented by an electrophoretic display (EPD). The electrophoretic display displays texts or images according to the following principle. A microcapsule containing specific-colored ink microparticles having specific charges and a microcapsule containing different-colored ink microparticles having opposite charges are positioned on upper and lower transparent electrodes, respectively. Then, a voltage is applied to the upper and lower transparent electrodes, thereby displaying the texts or images.

The user input units 112, 113 are configured to generate input data for controlling the operation of the portable electronic device 100 by receiving commands from a user. The user input units 112, 113 may be implemented as keypads, dome switches, touch pads (static pressure/capacitance), jog wheels, jog switches, or the like.

The first user input unit 112 may be used to convert pages displayed on the display 111, and the second user input unit 113 may be used for volume control, menu shift, and the like.

The body 110 comprises an image sensor 134 configured to sense peripheral images of the body 110, an illumination sensor configured to sense luminance of ambient light, and the like. Functions and operations of the image sensor 134 and the illumination sensor are described below.

The body 110 may be further provided with input/output components such as a speaker and a microphone, an interface unit 170 configured to exchange data with an external device, a power supply unit 190 configured to supply power, and the like.

Figure 2:
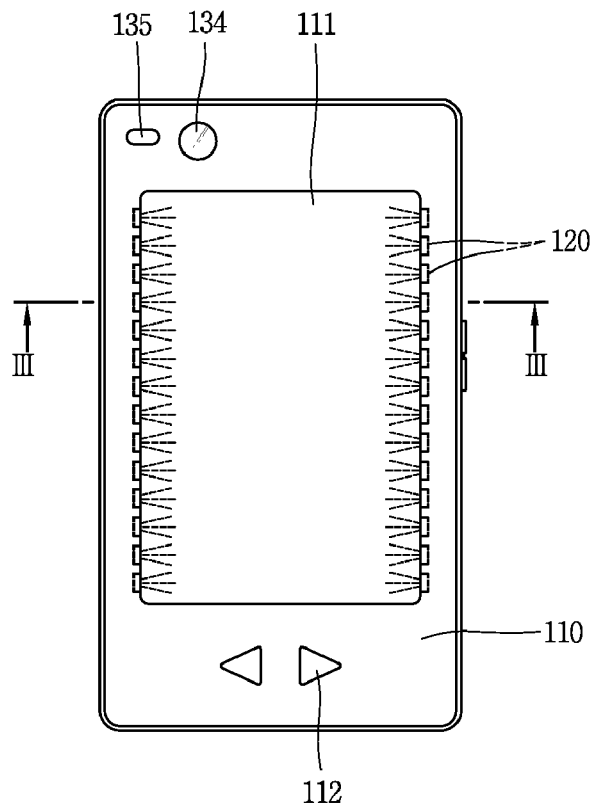
FIG. 2 is a front view of the portable electronic device of FIG. 1.
Figure 3:
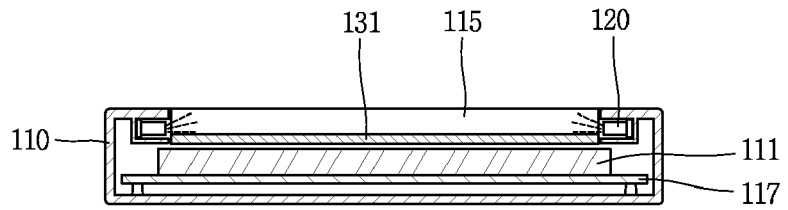
FIG. 3 is a sectional view of the portable electronic device taken along line 'III-III' in FIG. 2.

FIG. 2 is a front view of the portable electronic device of FIG. 1, and FIG. 3 is a sectional view of the portable electronic device taken along the line 'III-III' in FIG. 2. Since the E-paper is not provided with its own light emitting function, illumination is often desired to read text or images at night. Due to low optical transmittance, the E-paper has low illumination efficiency when illuminated by backlighting. This may cause a problem in that contents displayed on the E-paper may not be easily identified at night or in a dark place.

In order to solve or minimize this problem, referring to FIGS. 2 and 3, an illuminating unit 120, comprising a plurality of light sources and configured to illuminate a front surface of the display 111, is provided at the body 110. The illuminating unit 120 is arranged near the edges of the display 111 to illuminate the display 111. According to an embodiment of the present invention, a front surface of the display 111 is illuminated by light emitted from the illuminating unit 120 disposed on the side of the display 111, as exemplified in FIGS. 2 and 3. This illumination method may be referred to as front-lighting or side-lighting. However, this embodiment is not limited to the above described lighting methods, but may alternatively be implemented by back-lighting.

The plurality of light sources of the illuminating unit 120 may be sequentially disposed with a constant interval therebetween in a vertical direction of the display 111. For example, the illuminating unit 120 may be disposed at both sides of the display 111, as shown in FIGS. 2 and 3.

A window 115 is provided in front of the display 111. The window 115 may be formed of transparent material such as synthetic resin and reinforced glass. The window 115 not only serves to protect the display 111, but also serves to guide light emitted from the illuminating unit 120. For this, a light guiding pattern for reflecting the light may be formed on a front surface of the window 115.

According to an embodiment of the present invention, a touch sensor 131 configured to perform a touch screen function is provided at the window 115. The touch sensor 131 may be implemented as a transparent film layered onto a rear surface of the window 115. The touch sensor 131 is electrically connected to a printed circuit board where the display 111 is mounted.

Figure 4:
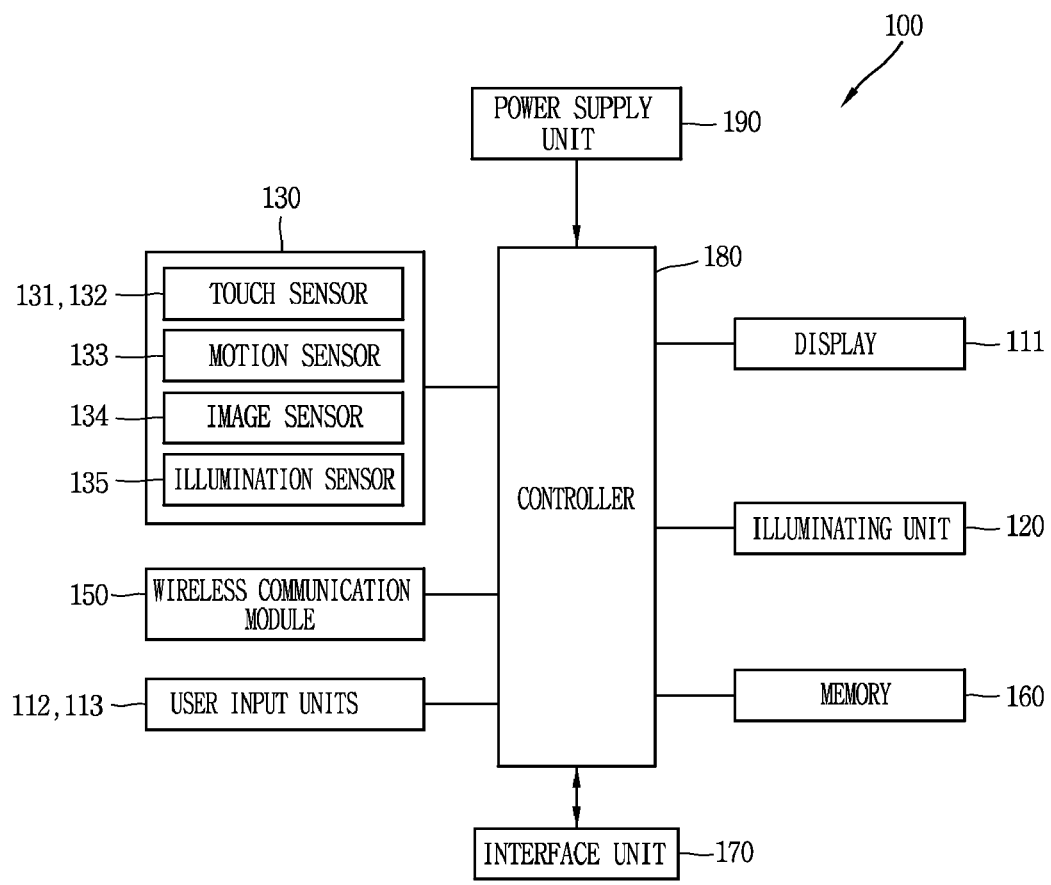
FIG. 4 is a block diagram of a portable electronic device in accordance with an embodiment of the present invention.

Referring to FIG. 4, the portable electronic device 100 comprises a display 111, an illuminating unit 120, a sensing unit 130, user input units 112, 113, a wireless communication module 150, a memory 160, an interface unit 170, a power supply 190, a controller 180, and the like. However, components of the portable electronic device 100 according to an embodiment of the present invention are not limited to the components illustrated in FIG. 4. Therefore, more or less components than the components shown in FIG. 4 may be applied to the portable electronic device 100.

Figure 5:
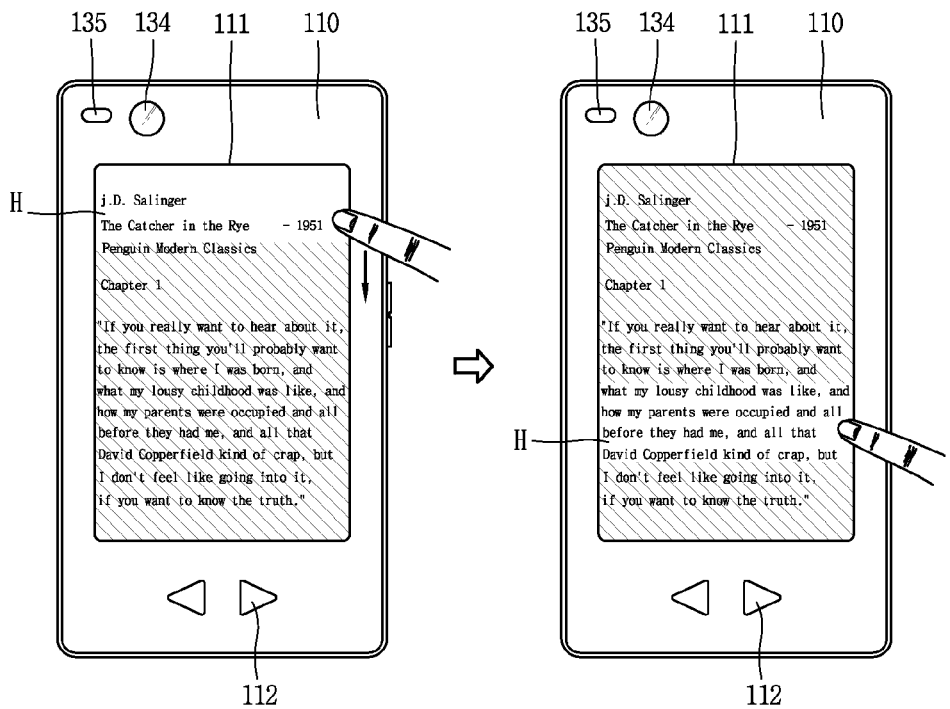
FIG. 5 illustrates operating a portable electronic device in accordance with an embodiment of the present invention.

Referring to FIG. 5, at least one of the plurality of light sources of the illuminating unit 120 is selectively operated, thereby generating a highlighted region (H) on a part of a screen of the display 111 that is illuminated. Accordingly, at least one of the plurality of light sources of the illuminating unit 120 arranged in a vertical direction of the display 111 is activated to emit light. Then, a highlighted region (H) is generated at a position corresponding to the activated at least one of the plurality of light sources of the illuminating unit 120.

The position of the highlighted region (H) may be determined according to the number of the plurality of light sources of the illuminating unit 120 simultaneously emitting light toward the display 111. The position of the highlighted region (H) may be preset or selected by a user.

The controller 180 controls the entire operation of the portable electronic device 100. Furthermore, the controller 180 controls the illuminating unit 120 to sequentially move the highlighted region (H). In the case that the illuminating unit 120 is arranged in a vertical direction of the display 111, the illuminating unit 120 is sequentially operated to move the highlighted region (H) under the control of the controller 180.

The highlighted region (H) may be set to move responsive to a user's input, or to move automatically when a preset time lapses. According to a user's selection, the portable electronic device 100 may be operated to implement a "highlighted illumination mode" in which the highlighted region (H) is generated, or an "entire illumination mode" in which the entire screen of the display 111 is illuminated.

According to an embodiment of the present invention, a part of the display 111 is illuminated in the "highlighted mode," and the illuminated part is movable. This may allow reduction of power consumption, and thus, allow the display 111 to be effectively illuminated. A user may move the highlighted region (H) not only via the user input units 112, 113, but also via other methods such as specific gestures and motions.

The sensing unit 130 of the portable electronic device 100 provides a sensing signal to control the operation of the portable electronic device 100 by sensing the current status of the portable electronic device 100. For example, the sensing unit 130 detects the position of the portable terminal 100, the presence or absence of user contact with the portable electronic device 100, orientation or acceleration/deceleration of the portable electronic device 100, and the like. Furthermore, the sensing unit 130 may also sense whether power has been supplied by the power supply 190, or whether the interface unit 170 has been coupled to an external device.

In one aspect of the present invention, the sensing unit 130 applies an input signal to the controller 180 by sensing a user's input to move the highlighted region (H), thereby allowing the highlighted region (H) to be moved to another part of the display 111. For this, the sensing unit 130 may include at least one touch sensors 131, 132, a motion sensor 133, or an image sensor 134.

Referring to FIG. 5, a command to move the highlighted region (H) is input via the touch sensor 131. Once a user touches a portion of the display 111, the touch sensor 131 of the display 111 senses the user's touch and applies a signal to the controller 180. In response, the controller 180 controls the illuminating unit 120 such that the highlighted region (H) can be generated at a part of the display 11 corresponding to the touched portion.

According to an embodiment of the present invention, the highlighted region (H) is moved in response to touch motions such as scroll, dragging, or flicking, the movement following the direction of the touch motion that is generated by a pointer, such as a finger of the user, in contact with the display 111. FIG. 5 illustrates that the highlighted region (H) is moved downward in the vertical direction when the user's finger is dragged downward.

The sensing unit 130 may further include an illumination sensor 135 configured to sense luminance of ambient light. The controller 180 controls the illuminating unit 120 such that the illuminating unit 120 automatically operates at night based on the intensity of the light sensed by the illumination sensor 135.

The wireless communication module 150 may be provided to the portable electronic device 100 to transmit/receive wireless signals to/from a mobile station through an antenna. The wireless communication module 150 is operated to allow the portable electronic device 100 to transmit or receive various contents through wireless communication.

The memory 160 may store programs to operate the controller 180, or may temporarily store input data or output data. In one embodiment of the present invention, the memory 160 stores the last position of the highlighted region (H) when the display 111 is deactivated. The memory 160 may be implemented using any type or combination of suitable memory including a flash memory type, a hard disk type, a multimedia card micro type, a card type (SD or XD memory), random access memory (RAM), and read-only memory (ROM), The interface unit 170 serves as a passage through which the portable electronic device 100 exchanges data with external devices. For example, the interface unit 170 receives data or power from the external devices, thereby transmitting the data or power to each component inside the portable electronic device 100. Further, the interface unit 170 may transmit data inside the portable electronic device 100 to the external devices. The interface unit 170 may include a wire/wireless headset port, an external charger port, a wire/wireless data port, a memory card port, a port connected to a device having an identification module, an audio input/output port, a video input/output port, an earphone port, and the like.

The power supply 190 receives external power or internal power under control of the controller 180, thereby supplying power to operate each component. The power supply 190 may be mounted in the body 110, or may be implemented as a detachable battery.

Figure 6:
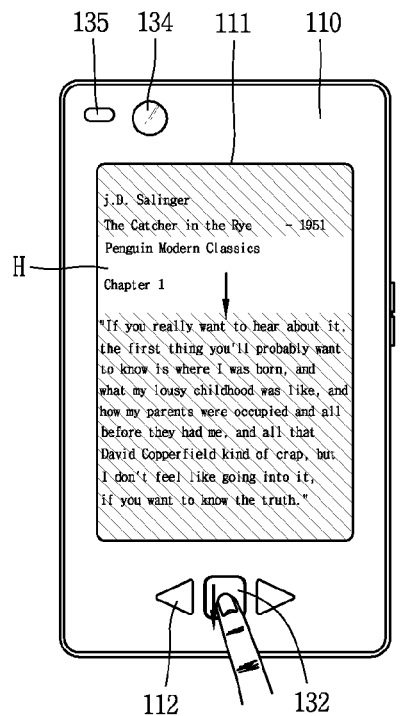
FIG. 6 illustrates operating a portable electronic device in accordance with an embodiment of the present invention.

Referring to FIG. 6, the body 110 is provided with a touch sensor 132 configured to input information in a scrolling manner. The controller 180 is configured to move the highlighted region (H) responsive to the information input via the touch sensor 132.

At least one of the plurality of light sources of the illuminating unit 120 may be configured to generate the highlighted region (H) with light having a first level luminance. Further, the rest of the illuminating unit 120 may be configured to illuminate other regions except for the highlighted region (H) with light having a second level luminance that is lower than the first luminance. In this case, the entire screen of the display 111 is illuminated with a low luminance while a region displaying text or to be read by a user is illuminated with a higher luminance. This may allow the user to view the entire screen with a low luminance at night. This may reduce power consumption, thus increasing the operation period of the portable electronic device 100.

In the above description, the highlighted region (H) was moved responsive to the user's input. However, in an "automatic mode," the controller 180 may control the illuminating unit 120 such that the highlighted region (H) is automatically moved without a user's input. In an automatic moving mode, the highlighted region (H) may be automatically moved as a preset time period lapses.

In contrast, in a "manual moving mode" in which the highlighted region (H) is moved by a user's input, the controller 180 may execute an alarm function to inform the user when the preset time period has lapsed without receiving any input. For example, when there has been no input signal for a preset time period, the controller 180 operates a vibrator mounted to the body 110 to generate vibration, or an alarm sound through a speaker. If there has been no input signal for a second preset time period since the vibrator was operated after the first preset time period, the controller 180 may deactivate the illuminating unit 120 to reduce power consumption.

The controller 180 may selectively implement a continuous illumination mode for continuously activating the highlighted region (H), and an instantaneous illumination mode for activating the highlighted region (H) when the highlighted region (H) has moved. Either the continuous illumination mode or the instantaneous illumination mode may be selected by the user.

In the aforementioned embodiments, the illuminating unit 120 is arranged at both sides of the display 111 in a vertical direction. However, according to an embodiment of the present invention, the illuminating unit 120 is arranged not only at both side parts of the display 111, but also at upper and lower parts of the display 111. In other words, the illuminating unit 120 is arranged along both horizontal and vertical directions of the display 111.

Figure 7:
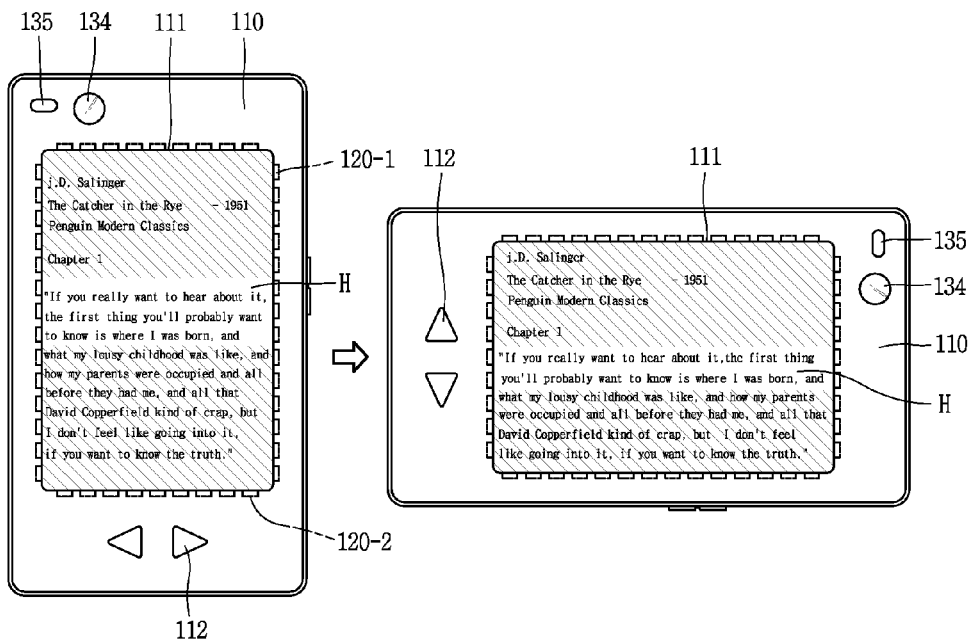
FIG. 7 illustrates operating a portable electronic device in accordance with an embodiment of the present invention.

Referring to FIG. 7, when the body 110 positioned in a vertical direction (portrait orientation) is repositioned to a horizontal direction (landscape orientation), the controller 180 converts the orientation of the output displayed on the screen of the display 111. Here, the posture change of the body 110 may be sensed by the motion sensor 133 such as a gyro sensor.

The controller 180 may selectively activate the illuminating unit 120 disposed in horizontal and vertical directions according to the posture change of the body 110. In the case that the body 110 is disposed in the vertical direction, the vertical illuminating unit 120-1 is activated, as shown on the left side in FIG. 7. Alternatively, when the body 110 is disposed in a horizontal direction, the horizontal illuminating unit 120-2 is activated, as shown on the right side in FIG. 7. Under this configuration, the highlighted region (H) can be implemented irrespective of the posture of the body 110.

The posture change of the body 110 may be sensed by the motion sensor 133. The motion sensor 133 applies posture information of the body 110 to the controller 180, and the controller 180 moves the highlighted region (H) based on the information.

Figure 8:
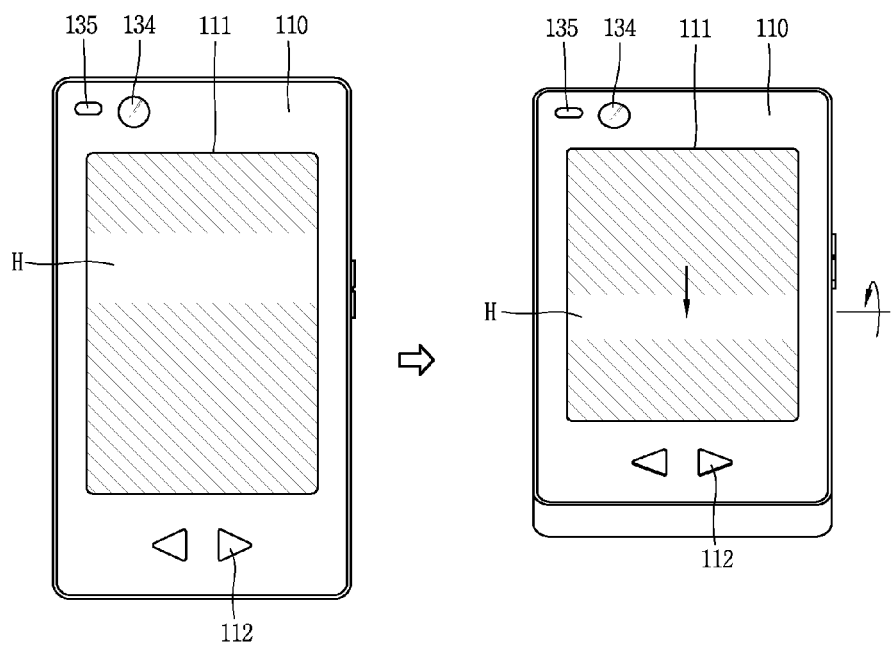
FIG. 8 illustrates operating a portable electronic device in accordance with an embodiment of the present invention.

Referring to FIG. 8, when the body 110 is tilted by a preset angle, the highlighted region (H) is moved. The controller 180 may control a moving direction, a position, and the like of the highlighted region (H) according to a tilted angle, a tilted duration, and/or a tilted direction of the body 110.

Various input methods may be implemented by using the motion sensor 133. For example, a moving distance of the highlighted region (H) is proportional to a tilted angle or a tilted duration of the body 110. In another example, when the body 110 is tilted in one direction, the highlighted region (H) is moved to the one direction, and when tilted in an opposite direction, the highlighted region (H) is moved to the opposite direction.

Here, the input to move the highlighted region (H) may be recognized not only by using the motion sensor 133, but also by using the image sensor 134. The image sensor 134 may be configured to recognize a user's iris or face. In this case, the controller 180 controls a moving status, a position, and the like of the highlighted region (H) according to the change of the user's iris or face sensed by the image sensor 134. For example, the highlighted region (H) is moved according to a moving direction of the user's iris. Alternatively, when the change of the user's preset face is sensed, the highlighted region (H) is moved.

Figure 9:
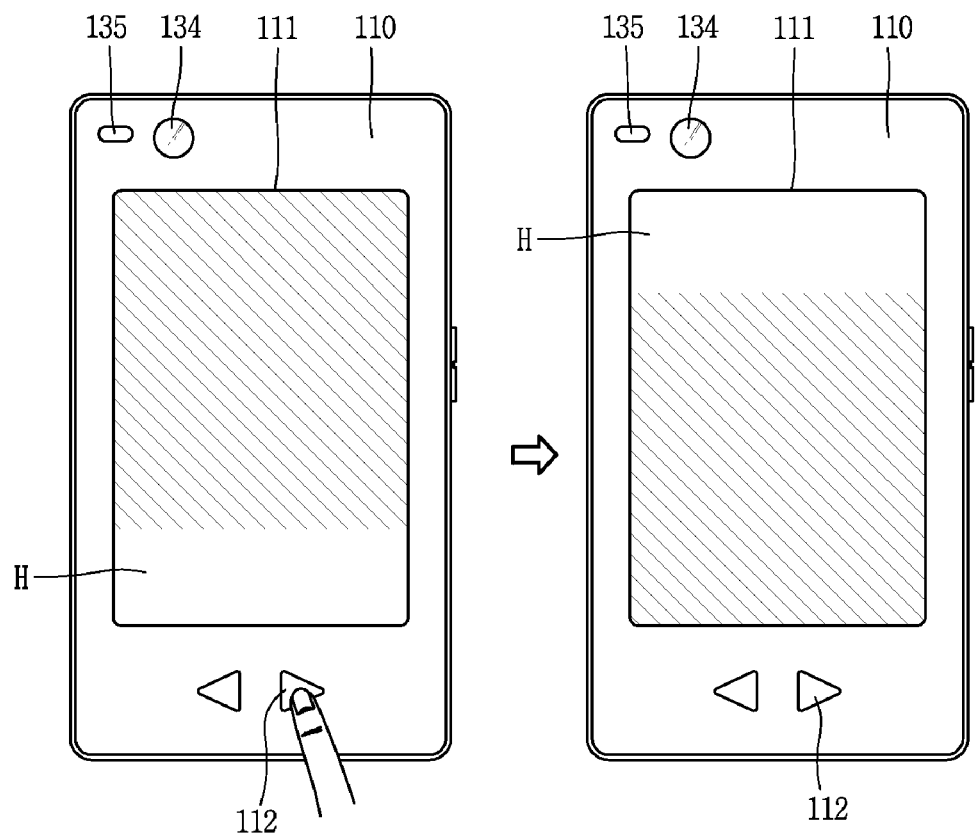
FIG. 9 illustrates operating a portable electronic device in accordance with an embodiment of the present invention.

Referring to FIG. 9, the controller 180 may be configured to generate the highlighted region (H) at a preset position when the screen of the display 111 is converted to a new page. That is, the highlighted region (H) may be set to be generated at a preset position under a specific circumstance. For example, in a 'highlight illumination mode', the highlighted region (H) is formed at an upper end portion of the display 111.

Further referring to FIG. 9, when the screen of the display 111 is converted to the next page from the current page, the highlighted region (H) may be set to be generated at an upper end portion of the next page. Alternatively, when the screen of the display 111 is converted to the previous page from the current page, the highlighted region (H) may be set to be generated at a lower end portion of the previous page. This may allow the user to easily view information on the display 111 even at night when the current page is converted to another page.

Figure 10:
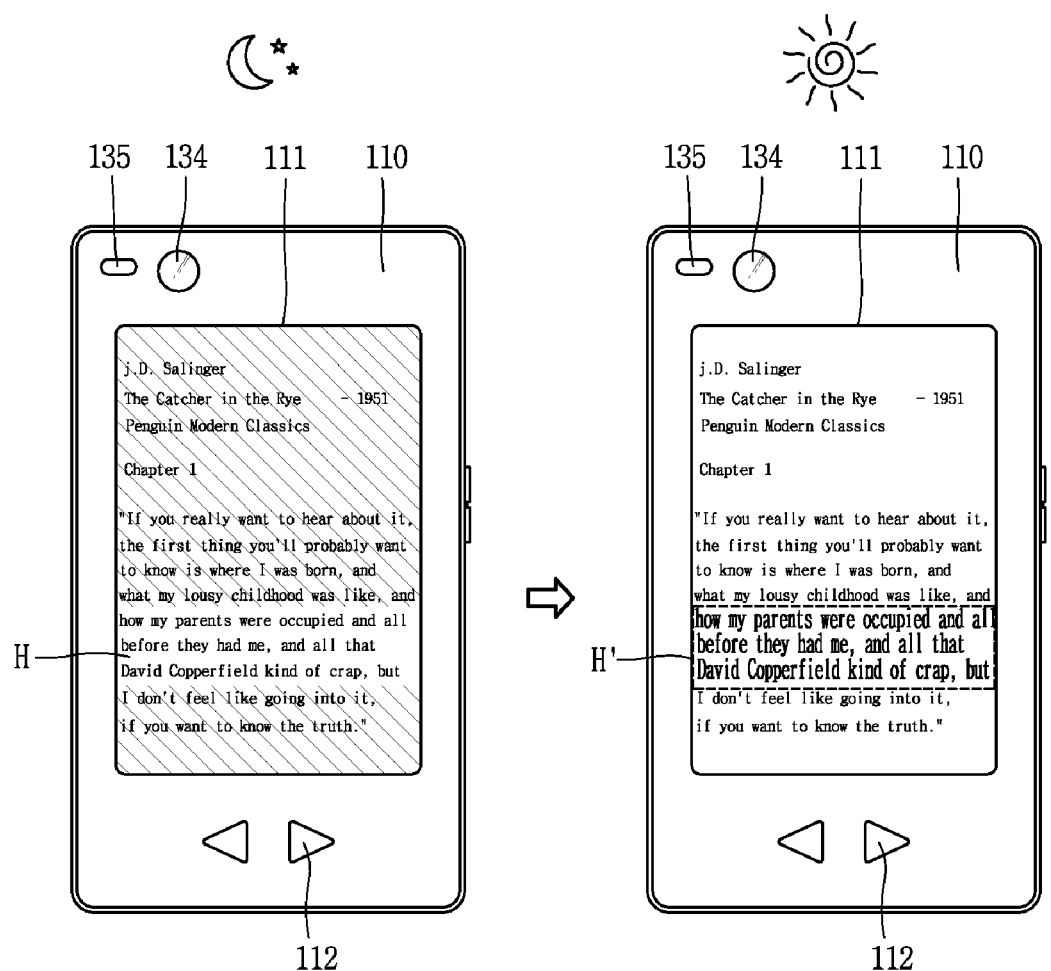
FIG. 10 illustrates operating a portable electronic device in accordance with an embodiment of the present invention.

Referring to FIG. 10, by using the illumination sensor 135, the controller 180 may determine to operate in a "nighttime mode" in which the illuminating unit 120 is activated (shown on the left side in FIG. 10), or a "daytime mode" in which the illuminating unit 120 is activated (shown on the right side in FIG. 10). In particular, when luminance sensed by the illumination sensor 135 is lower than a preset value, the controller 180 automatically operates in the nighttime mode. However, when the luminance sensed by the illumination sensor 135 is higher than the preset value, the controller 180 automatically operates in the daytime mode such that the illuminating unit 120 is not operated. Alternatively, the nighttime mode and the daytime mode may be selected according to the time of the day indicated by a clock mounted in the memory 160. Further, the nighttime mode and the daytime mode may be manually selected by a user.

According to the above described configuration, the illuminating unit 120 is not operated during the daytime, thereby reducing power consumption. In order to distinguish a part to be read by the user from the rest parts during the daytime, a specific region (H') on the display 111 may be differentiated from the rest regions. For example, the size or color of a text displayed on the specific region (H') is made to be different from that displayed on the rest of the regions on the display 111, thereby allowing the user to easily view the text displayed on the specific region (H'). FIG. 10 (on the right side) shows that the text is displayed in a larger size on the specific region (H') compared to the texts on other regions of the display 111 in the daytime mode.

Referring to FIG. 11, when the display 111 is in a deactivated status as power of the portable electronic device 10 is turned OFF or the current mode is converted to a standby mode, a text last viewed by the user is displayed. Further, when the display 111 is deactivated or the current screen is converted into another screen, a text last viewed by the user is stored in the memory 160. This may be executed by the user's command, or by automatically storing the last position of the highlighted region (H) in a nighttime mode.

When activating the deactivated display 111, the text last viewed by the user may be displayed as the nighttime mode or the daytime mode. In the nighttime mode, when the display 111 is reactivated, the controller 180 controls the illuminating unit 120 such that the highlighted region (H) is generated at the last position stored in the memory 160. In the daytime mode, when the display 111 is reactivated, the controller 180 controls the display 111 such that the text last viewed by the user is displayed at the last position stored in the memory 160, the text last viewed by the user displayed on the display 111 in the form of symbols, texts, icons, or like.

When the user touches the last viewed text, a vibrator or a speaker may generate vibration or an alarm sound. Under this configuration, the portable electronic device 100 may perform a bookmark function, for example displaying the "BookMark" 119, thereby allowing the user to more easily recognize and read the desired information.

As aforementioned, the E-paper is partially illuminated and the illuminated part of the E-paper is moved according to an embodiment of the present invention. The partial illumination of the E-paper can reduce power consumption by the portable electronic device and may also provide more effective recognition of text displayed on the display. Furthermore, the present invention provides various user input methods to move the highlighted region on the E-paper.

It will be apparent to those skilled in the art that various modifications and variations can be made without departing from the spirit or scope of the invention. Thus, it is intended that the present invention covers the modifications and variations of this invention provided they come within the scope of the appended claims and their equivalents.

What is claimed is:

1. A portable display device, comprising:
   a display formed with electronic paper, the electronic paper being configured to display data in response to applied electrical current, and to maintain displaying of the data in an absence of the applied electrical current;
   an illuminating unit configured to selectively illuminate each particular region of a plurality of regions of the display, the illuminating unit comprising a plurality of light sources which are individually associated with one or more of the plurality of regions of the display;
   a controller configured to activate the illuminating unit, selectively activating a first group of the plurality of light sources to illuminate a particular region of the display responsive to user contact, wherein the first group comprises at least one of the plurality of light sources; and
   an illumination sensor configured to detect luminance of ambient light,
   wherein:
   the controller is further configured to operate in a nighttime mode in which the illuminating unit is activated, or to operate in a daytime mode in which the illuminating unit is not activated;
   the illuminating unit is activated based upon the detected luminance such that the nighttime mode is automatically activated when a level of the detected luminance is less than a preset value; and
   in the daytime mode, the displayed data that is associated with the particular region of the display is distinguished from the displayed data of other regions of the display based upon a different size or color of text of the displayed data.

2. The device of claim 1, further comprising:
   a touch sensor positioned proximate to the display and configured to detect the user contact relative to each of the plurality of regions of the display, wherein the particular region of the display that is illuminated corresponds to a location, relative to a particular region of the plurality of regions of the display, the user contact is detected via the touch sensor.

3. The device of claim 2, wherein the touch sensor is layered onto the display in a form of a film.

4. The device of claim 3, wherein the controller is further configured to:
   successively activate one or more adjacent light sources of the plurality of light sources in a direction responsive to the user contact including contact relative to the touch sensor that occurs over a distance.

5. The device of claim 1, wherein the plurality of light sources are disposed adjacent to an edge of the display.

6. The device of claim 1, wherein the controller is further configured to:
   activate the illuminating unit to activate the first group of at least one light source at a first luminance level; and
   activate the illuminating unit to activate a second group of the plurality of light sources at a second luminance level which is less than the first luminance level, wherein the second group comprises light sources which are not included in the first group.

7. The device of claim 1, wherein the plurality of light sources are positioned relative to the display in such a manner that a substantially constant distance is maintained between adjacent ones of the plurality of light sources.

8. The device of claim 1, wherein:
   the display comprises opposing first and second edges, and opposing third and fourth edges; and
   some of the plurality of light sources are located relative to the first and second edges, and remaining light sources of the plurality of light sources are located relative to the third and fourth edges.

9. The device of claim 1, further comprising:
   a motion sensor configured to detect relative motion of the device, wherein the controller is further configured to, responsive to an input from the motion sensor, selectively illuminate another region of the plurality of regions of the display responsive to detecting a tilt of the device relative to an initial position, wherein the another region varies in a manner that corresponds to a degree of an angle of the tilt.

10. The device of claim 1, further comprising:
    an image sensor configured to obtain input representative of a user's iris or face, and wherein the controller is further configured to, responsive the input obtained by the image sensor, selectively illuminate another region of the plurality of regions of the display responsive to detecting a change of the user's iris or face by the image sensor.

11. The device of claim 1, wherein the controller is further configured to automatically select another region of the plurality of regions of the display when a preset time period lapses after illuminating the particular region.

12. The device of claim 1, wherein the controller is further configured to activate the illuminating unit to:
    illuminate a preset region of the plurality of regions of the display when the displayed data represents another page of data;
    selectively illuminate an upper end region of the display when the another page of data is a next page; and
    selectively illuminate a lower end region of the display when the another page of data is a previous page.

13. The device of claim 1, wherein the controller is further configured to operate in:
    a continuous illumination mode for continuously illuminating the particular region of the display; or
    an instantaneous illumination mode for illuminating the particular region of the display until another region of the display is to be illuminated responsive to further user contact associated with a different region of the display.

14. The device of claim 1, further comprising:
    a haptic device configured to generate vibration, and wherein the controller is further configured to activate the haptic device when no input signal is recognized for a first preset time while the illuminating unit is in an activated state.

15. The device of claim 14, wherein the controller is further configured to deactivate the illuminating unit when no input signal is recognized for a second preset time after the haptic device is activated.

16. The device of claim 1, further comprising:
a memory configured to store a last illuminated region of the display before the illuminated unit becomes inactive.

17. The device of claim 16, wherein the controller is further configured to illuminate the last illuminated region stored in the memory when the illuminated unit becomes reactivated.

18. The device of claim 16, further comprising:
a haptic device configured to generate vibration;
a touch sensor positioned proximate to the display and configured to detect the user contact relative to each of the plurality of regions of the display, wherein:
the particular region of the display that is illuminated corresponds to a location, relative to a particular region of the plurality of regions of the display, the user contact is detected via the touch sensor; and
the controller is further configured to activate the haptic device upon receiving the user contact at the last illuminated region stored in the memory when the illumination unit is reactivated.

* * * * *